United States Patent [19]

Igarashi

[11] Patent Number: 5,164,908
[45] Date of Patent: Nov. 17, 1992

[54] CAD SYSTEM FOR GENERATING A SCHEMATIC DIAGRAM OF IDENTIFIER SETS CONNECTED BY SIGNAL BUNDLE NAMES

[75] Inventor: Shinichi Igarashi, Tokyo, Japan
[73] Assignee: NEC Corporation, Tokyo, Japan
[21] Appl. No.: 482,956
[22] Filed: Feb. 21, 1990
[30] Foreign Application Priority Data
  Feb. 21, 1989 [JP] Japan .................................. 1-40554
[51] Int. Cl.$^5$ ............................................. G06F 15/60
[52] U.S. Cl. .................................. 364/491; 364/490; 364/489; 364/488
[58] Field of Search ............... 364/488, 489, 490, 491, 364/; 395/921, 100, 140

[56]     References Cited
     U.S. PATENT DOCUMENTS

| T940,020 | 11/1975 | Brechling et al. | 364/491 |
|---|---|---|---|
| 4,813,013 | 3/1989 | Dunn | 364/488 |
| 4,964,056 | 10/1990 | Bekki et al. | 364/488 |
| 5,038,294 | 8/1991 | Arakawa et al. | 364/491 |
| 5,065,355 | 11/1991 | Hayase | 364/491 |

OTHER PUBLICATIONS

Anjali Arya et al., "Automatic Generation of Digital System Schematic Diagrams", 22nd Design Automation Conference, IEEE, 1985, Paper 24.4, pp. 388-395.

*Primary Examiner*—Vincent N. Trans
*Attorney, Agent, or Firm*—Foley & Lardner

[57]     ABSTRACT

For use in generating a schematic diagram in compliance with logic connection informating specifying symbol tags indicative of individual symbols, pin names of the symbols, symbol classifiers for classifying the symbols into a plurality of classes, and signal names corresponding to the pin names, a computer aided design system comprises a group and set determining unit and a signal bundle name determining arrangement. The unit is intermittently used in determining identifier groups, each consisting of the symbol tags indicative of the symbols classified into one of the classes and the signal names corresponding to the pin names of the symbols. The arrangement determines signal bundle names, each in connection with the signal names included in most of the identifier groups and with only one signal name included in other identifier group or groups. When supplied with the signal bundle name or names determined in connection with each identifier group, the unit is used in determining one of identifier sets, each consisting (A) of at least one symbol tag used in each identifier group together with one of the signal bundle names and (B) of one of the symbol classifiers that classifies, into one of the classes, at least one symbol which is used in the identifier group under consideration and has at least one pin name corresponding to the signal name in question. Being operable in a known manner, a placing and routing unit generates the schematic diagram by placing the identifier sets at pertinent places and routing such sets by the signal bundle names.

7 Claims, 6 Drawing Sheets

FIG. 2

| SYMBOL TAG | PIN NAME | SYMBOL CLASSIFIER | SIGNAL NAME |
|---|---|---|---|
| TO1 | O1 | CON | A(1) |
| TO2 | O1 | CON | A(2) |
| TO3 | O1 | CON | A(3) |
| SO1 | O1 | SS1 | A(1) |
| SO1 | O2 | SS1 | B(1) |
| SO1 | O3 | SS1 | C(1) |
| SO2 | O1 | SS1 | A(2) |
| SO2 | O2 | SS1 | B(2) |
| SO2 | O3 | SS1 | C(1) |
| SO3 | O1 | SS1 | A(3) |
| SO3 | O2 | SS1 | C(2) |
| SO3 | O3 | SS1 | |
| SO4 | O4 | SS2 | B(1) |
| SO4 | O4 | SS2 | C(1) |
| SO5 | O5 | SS2 | B(2) |
| SO5 | O5 | SS2 | C(2) |
| | | | |

$$
\begin{cases}
(1,1) & \begin{array}{l} T01 \cdot A(1) \\ T02 \cdot A(2) \\ T03 \cdot A(3) \end{array} \\\\
(2,1) & \begin{array}{l} S01 \cdot A(1) \\ S02 \cdot A(2) \\ S03 \cdot A(3) \end{array} \\\\
(2,2) & \begin{array}{l} S01 \cdot B(1) \\ S02 \cdot B(2) \\ S03 \cdot C(2) \end{array} \\\\
(2,3) & \begin{array}{l} S01 \cdot C(1) \\ S02 \cdot C(1) \\ S03 \end{array} \\\\
(3,4) & \begin{array}{l} S04 \cdot B(1) \\ S05 \cdot B(2) \end{array} \\\\
(3,5) & \begin{array}{l} S04 \cdot C(1) \\ S05 \cdot C(2) \end{array}
\end{cases}
$$

FIG. 6

| RULE CLASSIFIER | RULE DATA |
|---|---|
| DEL | ( |
| B DATA | 1 |
| B DATA | 2 |
|  |  |
|  |  |
| B DATA | 9 |
| B DATA | 0 |
| B DATA | P |

17

```
(1,1,1)      TO1 · A(1-3)
             TO2 · A(1-3)
             TO3 · A(1-3)

(2,1,1)      SO1 · A(1-3)
             SO2 · A(1-3)
             SO3 · A(1-3)

(2,2,1)      SO1 · B(1-2)
             SO2 · B(1-2)

(2,2,2)      SO3 · C(2)

(2,3,1)      SO1 · C(1)
             SO2 · C(1)

(2,3,2)      SO3

(3,4,1)      SO4 · B(1-2)
             SO5 · B(1-2)

(3,5,1)      SO4 · C(1-2)
             SO5 · C(1-2)
```

CAD SYSTEM FOR GENERATING A SCHEMATIC DIAGRAM OF IDENTIFIER SETS CONNECTED BY SIGNAL BUNDLE NAMES

BACKGROUND OF THE INVENTION

This invention relates to a computer aided design (CAD) system and method for generating a schematic diagram of circuitry in compliance with logic connection information.

Various computer aided design systems are already used in generating a schematic diagram of circuitry in compliance with logic connection information. According to the prior art, all symbols are arranged on the schematic diagram according to the connection information. When there are a great number of symbols which number and have complicated relationships to one another, the schematic diagram accordingly becomes complicated and must be generated on a great number of sheets.

An improved computer aided design system is described in a paper contributed by Anjali Arya et al. to the Twenty-second Design Automation Conference held 1985 by the IEEE. The paper is numbered "24.4". Its title reads "Automatic Generation of Digital System Schematic Diagrams". According to Arya et al., modules are arranged on a schematic diagram together with a path net connecting the modules to one another.

SUMMARY OF THE INVENTION

It is an object of the present invention to provide a computer aided design system and method for generating a schematic diagram of circuitry, which diagram is simple and is readily understood when such diagrams become familiar.

It is another object of this invention to provide a computer aided design system and method of the type described, which can generate the schematic diagram on a small number of sheets.

It is still another object of this invention to provide a computer aided design system and method of the type described, wherein logic connection information is used in generating the schematic diagram to represent each module of the above-referenced Arya et al paper as a symbol which consists of two identifiers, namely, a symbol tag indicative of the symbol and a symbol classifier for classifying such symbols into a plurality of classes, and has, as another identifier, a pin name of a pin for either receiving an input signal or producing an output signal.

On describing the gist of this invention, it can be understood that the computer aided design system and method are for generating a schematic diagram of circuitry in compliance with logic connection information specifying symbol tags indicative of individual symbols, the pin names of the symbols, symbol classifiers for classifying the symbols into a plurality of classes, and connection signal names corresponding to the pin names of the symbols.

According to this invention, the above-understood computer aided design system and method comprise a group determining unit or step, a signal bundle name determining unit or step, a set determining unit or step, and a placing and routing unit or step.

The group determining or step unit is supplied with the connection information and is for determining a plurality of identifier groups. Each identifier group consists of the symbol tags indicative of the symbols classified into one of the classes and the signal name corresponding to at least one of the pin names of the connection information of the symbols classified into that one of the classes. The group determining unit or step thereby produces group signals representative of the identifier groups, respectively.

The signal bundle name determining unit or step operates in connection with the group determining unit or step and is for determining a plurality of signal bundle names. Each signal bundle name is determined in connection with the signal names represented by each group signal to be identical with each other and in connection with only one of the signal names of the connection information that is represented by each of the group signals to be not identical with others of the signal names represented by the above-mentioned each of the group signals. The signal bundle name determining unit or step thereby produces bundle signals representative of the signal bundle names, respectively.

The set determining unit or step operates in connection with the group determining unit or step and the signal bundle name determining unit or step and is for determining a plurality of identifier sets. Each identifier set consists of (A) at least one symbol tag represented by each of the group signals together with the signal bundle name represented by each of the bundle signals and (B) one of the symbol classifiers that classifies, into one of the classes, at least one symbol which is indicated by that at least one symbol tag and which has at least one of the pin names that corresponds to the last-mentioned signal bundle name.

The placing and routing unit or step operates in connection with the set determining unit or step, is supplied with the connection information, and is for generating the schematic diagram by placing the identifier sets at a plurality of places and by routing, by the signal bundle names, the pin names of the symbols indicated by the symbol tags included in the identifier sets.

BRIEF DESCRIPTION OF THE DRAWING

FIG. 2 exemplifies the memory content of a connection information memory of the computer aided design system depicted in FIG. 1;

FIG. 5 exemplifies identifier groups determined by the group and set determining unit in connection with the memory content exemplified in FIG. 2;

FIG. 6 exemplifies the memory content of a bundle rule memory of the computer aided design system shown in FIG. 1;

DESCRIPTION OF THE PREFERRED EMBODIMENT

Figure 1:
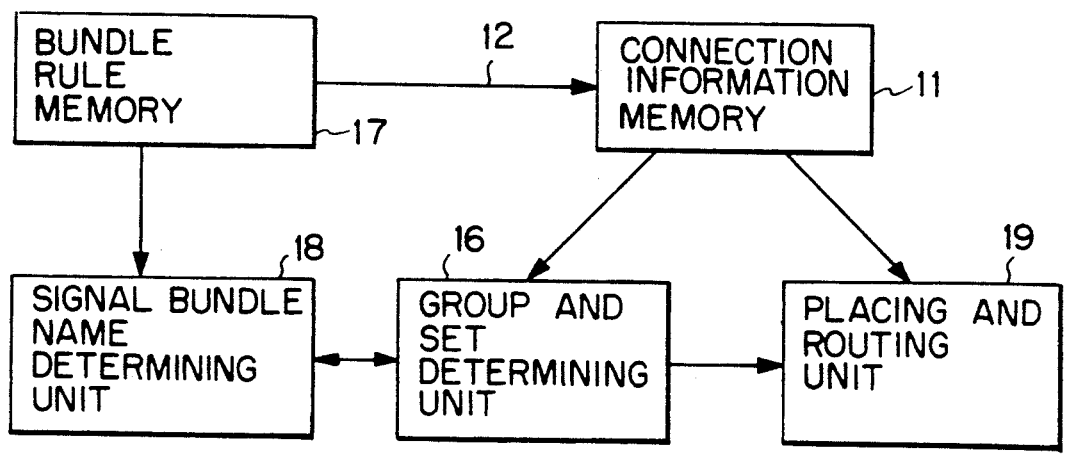
FIG. 1 is a block diagram of a computer aided design system according to an embodiment of the instant invention.

Referring to FIG. 1, the description will begin as with regard to a computer aided design (CAD) system according to a preferred embodiment of the present invention. The computer aided design system is for generating or drawing a schematic diagram of circuitry in compliance with logic connection information which represents or specifies symbol tags, pin names, symbol classifiers, and connection signal names in the manner which will presently be illustrated. Each of the symbol tags, pin names, symbol classifiers, and signal names will alternatively be called an identifier depending on the circumstances.

The computer aided design system comprises a connection information memory 11 for storing the connection information supplied through an input conductor 12. A group and set determining unit 16 is connected to the connection information memory 11 to produce group signals among others. A bundle rule memory 17 is for storing a bundle rule which will be described in due course. Supplied with the group signals and referring to the bundle rule memory 17, a signal bundle name determining unit 18 delivers bundle signals back to the group and set determining unit 16. When supplied with the bundle signals, the group and set determining unit 16 refers to the connection information memory 11 and produces set signals. Supplied with the set signals and referring to the connection information memory 11, a placing and routing unit 19 generates the schematic diagram. Operation of the system elements 16 through 19 will become clear as the description proceeds.

Figure 3:
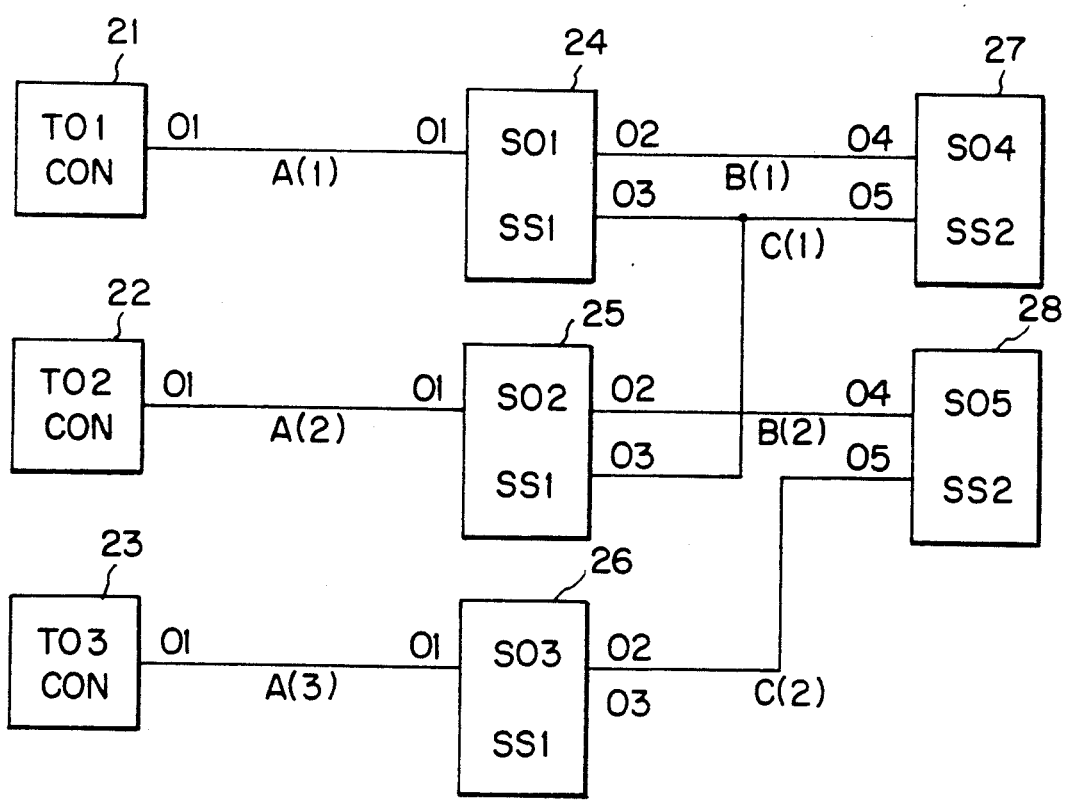
FIG. 3 is a block diagram of circuitry represented by the memory content exemplified in FIG. 2.

Turning to FIGS. 2 and 3, the description will proceed to an example of the logic connection information which should be stored in the connection information memory 11 through the input conductor 12. In the example being illustrated, first through eighth symbols 21, 22, 23, 24, 25, 26, 27, and 28 are uniquely indicated by the symbol tags which are herein TO1 through TO3 and SO1 through SO5. In this manner, the symbol tags are individually indicative of the symbols.

The first through the third symbols 21 to 23 are classified into a first class of symbols. The fourth through the sixth symbols 24 to 26 are classified into a second class. The seventh and the eighth symbols 27 and 28 are classified into a third class. The symbol classifiers are therefore first through third classifiers CON, SS1, and SS2 and are for classifying the symbols into a plurality of classes. From a different point of view, the symbol classifiers are for grouping the symbols into a plurality of symbol groups. For example, the first classifier indicates a connector. The second classifier indicates a set or combination of gate circuits. The third classifier indicates another set of gate circuits.

Each of the first through the third symbols 21 to 23 has a single output pin. Each of the fourth through the sixth symbols 24 to 26 has a single input pin and two output pins. Each of the seventh and the eighth symbols 27 and 28 has two input pins. The output pins of the symbols 21 through 23 are given a first pin name 01, namely, are identified by a pin number 01 in common. The input pins of the symbols 24 through 26 are connected to the output pins 01, respectively, and are all given the first pin name 01. The output pins of each of the symbols 24 through 26 are given second and third pin names 02 and 03. The input pins of each of the symbols 27 and 28 are given fourth and fifth pin names 04 and 05 regardless of connection of the pins 04 of the symbols 27 and 28 to the pins 02 and 03 of the symbol 24 and of connection of the pin 05 of the symbol 27 to the pins 03 of the symbols 24 and 25. It is possible in this manner to appreciably arbitrarily give the pin names to the input and the output pins.

The connection signal names are names given to signals transmitted through paths, each path being between at least a pair of pins. More particularly, each signal name represents a signal transmitted either from one of the output pins to at least one of the input pins or to one of the input pins from at least one of the output pins.

Between the pins 01 of the first and the fourth symbols 21 and 24, the signal is given a signal name A(1). In this manner, the signals are named A(2), A(3), B(1), and B(2) between the second and the fifth symbols 22 and 25, between the symbols 23 and 26, between the symbols 24 and 27, and between the symbols 25 and 28. From the output pins 03 of the symbols 24 and 25 to the input pin 05 of the symbol 27, two signals are transmitted and given a signal name C(1) in common. The signal is named C(2) between the symbols 26 and 28. From the output pin 03, the sixth symbol 26 produces an output signal having no name, namely, an output signal of a blank name.

It is now understood that each signal name corresponds to at least a pair of pin names. More stringently, the signal names usually correspond to the pin names of the symbols. For example, the signal name A(1) corresponds to the pin names OI of the symbols 21 and 24. The signal name B(1) corresponds to the pin names 02 and 04 of the symbols 24 and 27. The signal name C(1) corresponds to the pin names 03 of the symbols 24 and 25 and to the pin name 05 of the symbol 27. The blank name corresponds to the pin name 03 of the symbol 26 alone.

Figure 4:
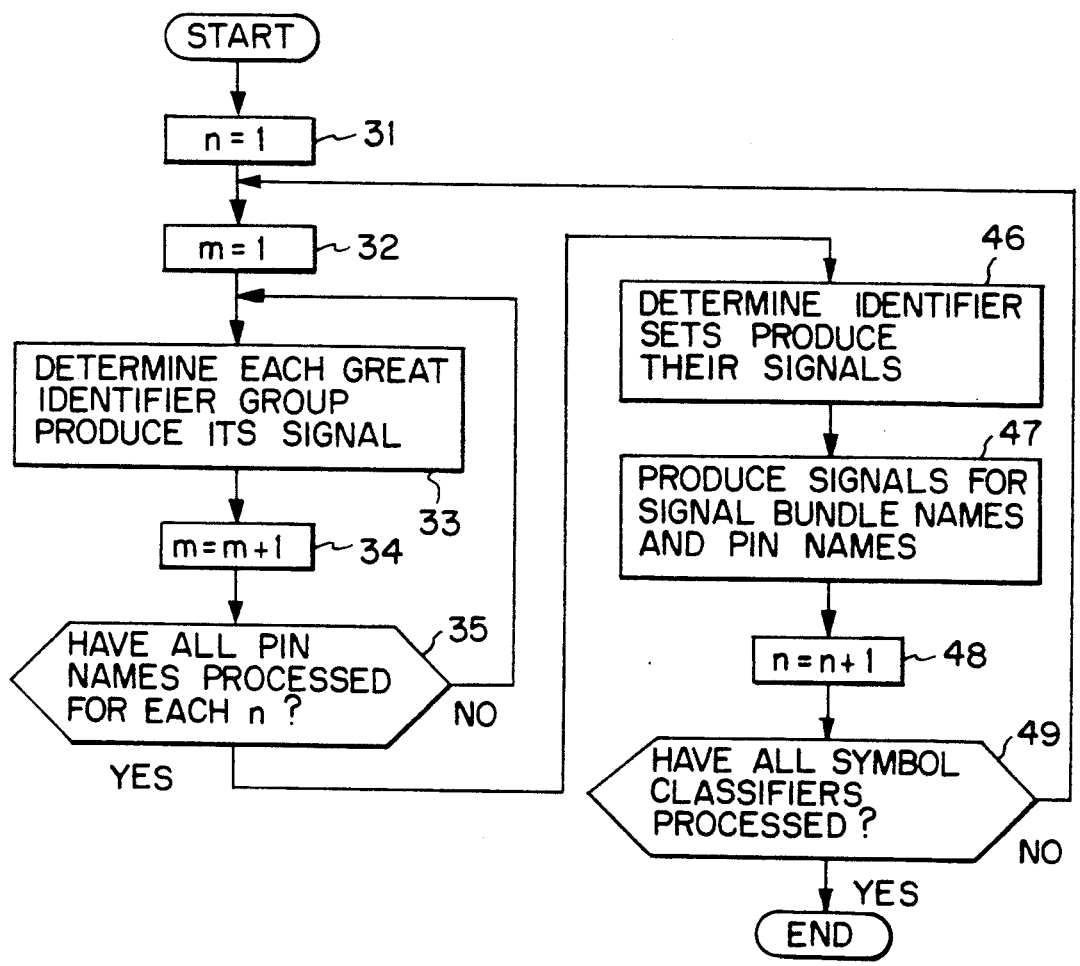
FIG. 4 is a flow chart for use in describing the operation of a group and set determining unit of the computer aided design system depicted in FIG. 1.

Referring to FIGS. 4 and 5, the group and set determining unit 16 is operable as follows intermittently as a group determining unit. When operation of the group and set determining unit 16 begins, a current classifier variable n is made equal to 1 at a first step 31 of grouping or of grouping and set forming. The current classifier variable n thereby becomes a first classifier variable. At a second step 32 of grouping, a current pin variable m is made equal to 1 to become a first pin variable.

At a third step 33 of grouping, the group determining unit refers to the connection information memory 11 and receives the symbol tags TO1 through TO3 of the symbols 21 to 23 having in common the first classifier CON indicated by the first classifier variable. Furthermore, the group determining unit receives the signal names A(1) through A(3) which correspond to the first pin name 01 indicated by the first pin variable. The group and set determining unit 16 thereby supplies the signal bundle name determining unit 18 with a No. (1, 1) group signal representative of a (1, 1) identifier group which consists, in the manner depicted in FIG. 5 at (1, 1), of three symbol tags and three signal names. These three symbol tags are indicative of the symbols 21 through 23 classified into the first class. The three signal names correspond to the first pin name 01 which is in common to the symbols 21 through 23.

The No. (1, 1) group signal will hereafter be referred to either as a No. (1, 1) small group signal or a No. 1 great group signal. Similarly, the (1, 1) identifier group will be called either a (1, 1) small identifier group or a first great identifier group. The reason will become clear as the description proceeds.

In this manner, each of the small group signal and the small identifier group is identified by a combination of first and second numerals enclosed with a pair of parentheses. In each combination, the first numeral represents a particular value given to the current classifier variable n. The second numeral represents a specific value given to the current pin variable m.

Supplied with the No. 1 great group signal, the signal bundle name determining unit 18 is put into operation in a manner which will shortly be described. In the meantime, the third step 33 proceeds to a fourth step 34 of grouping. At the fourth step 34, the group determining unit adds one to the first pin variable to provide a second pin variable indicative of the second pin name 02. At a fifth step 35 of grouping, the group determining unit refers to the connection information memory 11 to check whether or not all the pin names are already dealt with among the pin names of the symbols which have in common the first classifier CON indicated by the first classifier variable. If all the pin names are not yet dealt with, the fifth step 35 returns to the third step 33. If all the pin names are already processed, the group and set determining unit 16 becomes operable as a set determining unit as will later be described.

It may be mentioned at this stage of the description that FIG. 5 shows other small identifier groups which are numbered (2, 1), (2, 2), (2, 3), (3, 4), and (3, 5). The (2, 1) through the (2, 3) small identifier groups are represented by Nos. (2, 1) through (2, 3) small group signals successively at the third step 33 which is executed three times in connection with various values of the current pin variable m after the current classifier variable n is changed to a second classifier variable indicative of the second classifier SS1 in a manner which will later be described. The (3, 4) and the (3, 5) small identifier groups are represented by Nos. (3, 4) and (3, 5) small group signals which are successively produced when the third step 33 is repeatedly executed in connection with various values of the current pin variable m after the current classifier variable n is changed to a third classifier variable indicative of the third classifier SS2.

The Nos. (2, 1) through (2, 3) small group signals may alternatively be referred to collectively as a No. 2 great group signal. The Nos. (3, 4) and (3, 5) small group signals may collectively be called a No. 3 great group signal. The Nos. 2 and 3 great group signals represent second and third great identifier groups. Each of the first through the third identifier groups consists of (A) the symbol tags indicative of the symbols classified into one of the classes that is indicated by the current classifier variable n having the particular value and (B) the signal names which correspond to at least one of the pin names that of the symbols classified into that one of the classes. Depending on the circumstances, the great group signals and the great identifier groups are referred to simply as group signals and identifier groups.

Reviewing FIGS. 4 and 5, it can now be understood that the group determining unit of the group and set determining unit 16 comprises classifier and pin variable producing arrangements, a group signal producing arrangement, and a supplying arrangement. The classifier variable producing arrangement is for carrying out the first step 31 to produce a current classifier variable n indicative of one of the symbol classifiers, such as CON, SS1, or SS2, at a time. The classifier variable producing arrangement thereby indicates the symbols which are classified, as predetermined ones of the symbols, by that one of the symbol classifiers into one of the classes. The predetermined ones of the symbols are, for example, the symbols 21 through 23 of a first symbol group, the symbols 24 through 26 of a second symbol group, or the symbols 27 and 28 of a third symbol group.

The pin variable producing arrangement is connected to the classifier variable producing arrangement and is supplied with the connection information to execute the second, the fourth, and the fifth steps 32, 34, and 35 and to produce the current pin variable m. The group signal producing arrangement is connected to the classifier and the pin variable producing arrangements and is supplied with the connection information to execute the third step 33 and to produce each of the group signals. The group signal producing arrangement thereby indicates one of the identifier groups. The supplying arrangement is a bidirectional connection depicted in FIG. 1 between the group and set determining unit 16 and the signal bundle name determining unit 18, is connected to the group signal producing arrangement, and is for supplying the signal bundle name determining unit 18 with the group signals.

A first case will now be considered, in which each symbol has a plurality of pin names. For example, each of the symbols 24 through 26 of the second symbol group has three pin names 01 through 03. Each of the symbols 27 and 28 of the third symbol group has two pin names 04 and 05. In the first case, the current pin variable m indicates the pin names of the predetermined ones of the symbols as predetermined ones of the pin names of the connection information. The predetermined ones of the pin names are therefore the pin names 01 through 03 or the pin names 04 and 05. The above-mentioned each of the group signals indicates one of the identifier groups that consists of the symbol tags indicative of the predetermined ones of the symbols and the signal names corresponding to the predetermined ones of the pin names.

A second case will now be considered, in which the symbols of a symbol group have only one pin name in common. For example, the symbols 21 through 23 of the first symbol group have only the first pin name 01 in common. In the second case, the current pin variable m indicates the only one pin name as a predetermined pin name. The group signal producing arrangement produces a single one of the group signals and thereby indicates an additional one of the identifier groups that consists of at least one symbol tag indicative of the symbol or symbols having only one pin name and only one signal name.

In the first case, the current pin variable m represents a plurality of pin numbers, such as 01 through 03 or 04 and 05, indicative of the predetermined ones of the pin names while the current classifier variable n indicates the above-mentioned one of the symbol classifiers. The group signal producing arrangement indicates one of the identifier groups as a plurality of small identifier groups, equal in number to the pin numbers. In the second case, the current pin variable m represents only one pin number while the current classifier variable n indicates the single one of the symbol classifiers. The group signal producing arrangement indicates the additional one of the identifier group as a single small identifier group which is identical with the additional one of the identifier groups.

Turning now to FIG. 6 for a short while, the bundle rule memory 17 is for storing the bundle rule as follows. In the example illustrated, the bundle rule comprises rule classifiers and rule data. A first rule consists of a rule classifier DEL and a rule datum indicative of an opening parenthesis which is used as a delimiter in each signal name in discriminating between a representative name, such as A, B, or C, and a bit datum which is usually a bit number, such as 1, 2, or 3. The representative name is herein referred to alternatively as the signal name depending on the circumstances.

The first rule is for using the delimiter in recognizing the representative names and the bit data in connection with the respective signal names. Other rules consist of a common rule classifier BDATA and rule data representative of the bit numbers, such as 1 through 9, 0 (zero), and P. These other rules are for use in discriminating between the bit numbers and other bit data.

Figure 7:
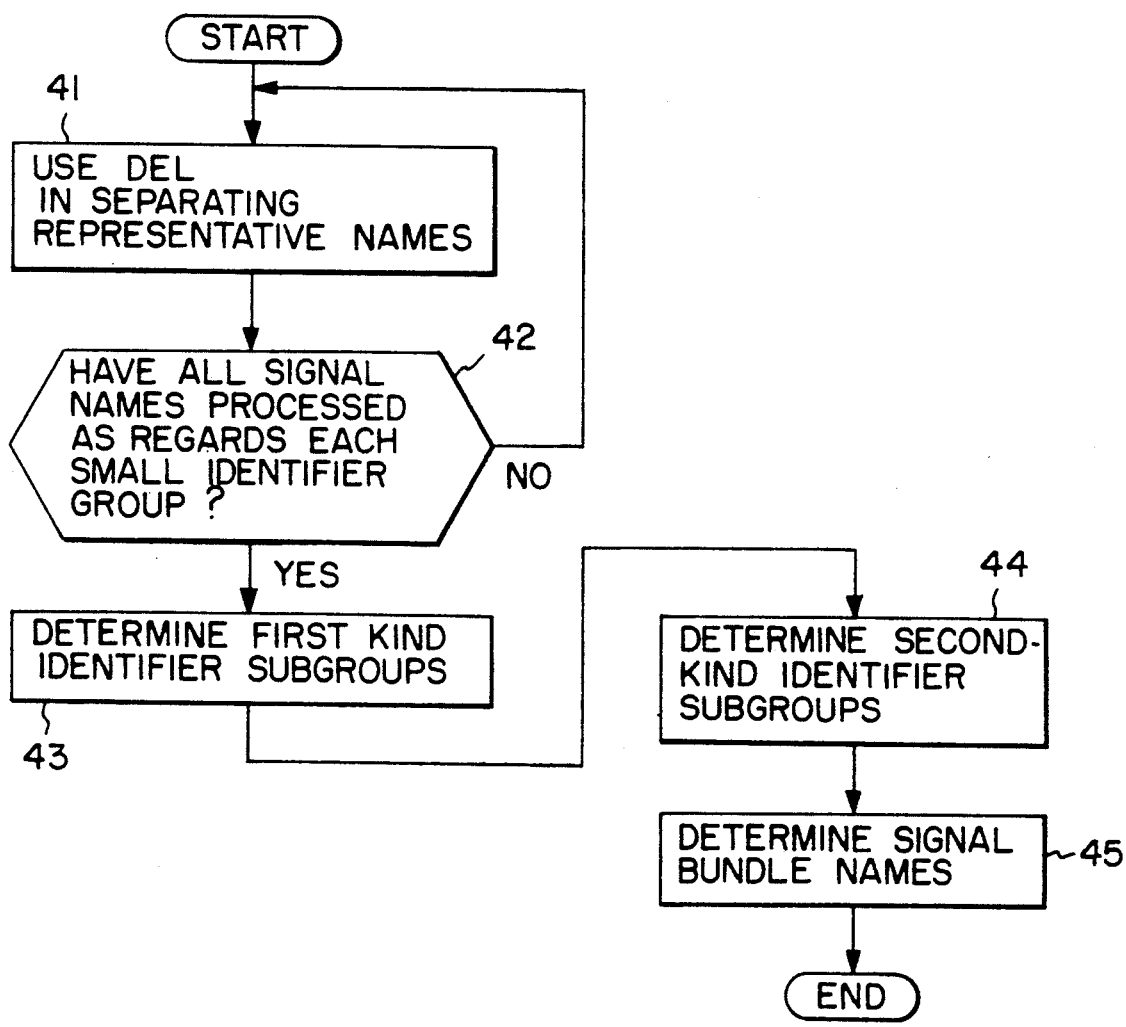
FIG. 7 is a flow chart for use in describing the operation of a signal bundle name determining unit of the computer aided design system illustrated in FIG. 1.
Figures 8, 9:
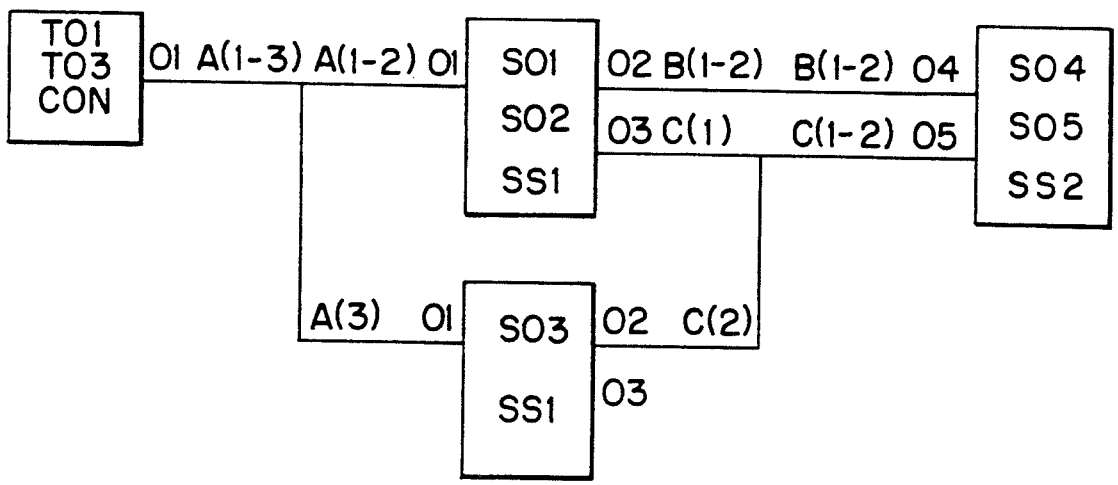
FIG. 8 shows identifier subgroups determined by the signal bundle name determining unit in connection with the identifier groups exemplified in FIG. 5.
FIG. 9 is a schematic diagram which is generated by the computer aided design system under consideration when the connection information memory stores the memory content exemplified in FIG. 2.

Further turning to FIGS. 7 and 8, the signal bundle name determining unit 18 starts its operation when supplied with each of the great group signals that is produced by the group and set determining unit 16 at the third step 33 in connection with each value of the current classifier variable n to represent an n-th great identifier group in general. Broadly speaking, the signal bundle name determining unit 18 is operable at first to classify each great or small identifier group into at least one identifier subgroup.

In the manner which is depicted in FIG. 8 and will be described as follows, a (1, 1, 1) identifier subgroup alone is derived from the first great identifier group depicted in FIG. 5 at (1, 1). Only one (2, 1, 1) identifier subgroup is derived from the (2, 1) small identifier group. Two identifier subgroups (2, 2, 1) and (2, 2, 2) are derived from the (2, 2) small identifier group. Two other identifier subgroup (2, 3, 1) and (2, 3, 2) are derived from the (2, 3) small identifier group. Identifier subgroups (3, 4, 1) and (3, 5, 1) are derived from the (3, 4) and the (3, 5) small identifier groups. Such identifier subgroups are classified into first and second kinds in a manner which will presently be described.

In the above-exemplified manner, the identifier subgroups are indicated by a combination of first through third numerals. The first and the second numerals are similar to those in the combination used in identifying each small identifier group. The third numeral represents the first and the second kinds by 1 and 2.

It will be assumed in general that the signal bundle name determining unit 18 is supplied with a No. (n, m) small group signal representative of an (n, m) small identifier group. The No. (n, m) small group signal is produced by the group and set determining unit 16 at the third step 33 when the current classifier variable n and the current pin variable m indicate a combination (n, m) of an n-th classifier variable and an m-th pin variable.

At a first step 41 of name determining, the signal bundle name determining unit 18 refers to the bundle rule memory 17. In compliance with the first rule, the signal bundle name determining unit 18 separates each of the signal names of the (n, m) small identifier group into the representative name and the bit datum. Depending on the circumstances, it may be found at the first step 41 that the (n, m) small identifier group consists of at least one symbol tag and the signal name or names having no bit number, namely, having one of the other bit data, such as the blank name. Such a small identifier group will shortly be described.

At a second step 42 of name determining, the signal bundle name determining unit 18 checks whether or not all the signal names of the (n, m) small identifier group are already dealt with. If all the signal names are not yet processed, the second step 42 returns to the first step 41. If all the signal names are already dealt with, the second step 42 proceeds to a third step 43 of name determining.

At the third step 43, the signal bundle name determining unit 18 classifies the (n, m) small identifier group into at least one identifier subgroup primarily in accordance with the representative name or names. More particularly, the (n, m) small identifier group may include the signal names of a common representative name. In this event, a single identifier subgroup is derived from the (n, m) small identifier group. Alternatively, the (n, m) small identifier group may include signal names having two or more different representative names. In this latter event, the (n, m) small identifier group is divided into at least two identifier subgroups in compliance with the representative names, respectively.

Additionally, the signal bundle name determining unit 18 refers to the bundle rule memory 17 at the third step 43 as regards the other rules. The signal bundle name determining unit 18 thereby derives one or more identifier subgroups of the first kind from the (n, m) small identifier group. In each of the identifier subgroups of the first kind, all the signal names have the bit numbers, such as 1 through 9, O, and P.

It should be noted in connection with the foregoing that the signal names of each identifier subgroup of the first kind have a single representative name in common. A single signal bundle name $\alpha(\beta)$ is therefore substituted at the third step 43 for the signal name or names. In the signal bundle name, $\alpha$ represents the single or common representative name and $\beta$, the bit numbers or number of the signal names or name.

At a fourth step 44 of name determining, the signal bundle name determining unit 18 again refers to the other rules to derive an identifier subgroup of the second kind which includes only one signal name that has either one of the bit numbers or one of the other bit data, such as the blank name. It is herein said merely for convenience of description that the signal bundle name determining unit 18 substitutes at the fourth step 44 a signal bundle name even for that one signal name which may be absent in fact. In FIG. 8, the (2, 2, 2) and the (2, 3, 1) identifier subgroups are identifier subgroups of the second kind, where C(2) or a blank shows the signal bundle name.

At a fifth step 45 of name determining, the signal bundle name determining unit 18 sends bundle signals back to the group and set determining unit 16. It should be noted in this connection that the signal bundle name determining unit 18 processes at the third and the fourth steps 43 and 44 each great group signal which may represent a plurality of small identifier groups if produced by the group and set determining unit 16 in succession at the third step 33 of grouping for the n-th classifier variable and for various values of the current pin variable m. For the second classifier variable, the bundle signals are produced to represent five representative names which are A(1-3), B(1-2), C(2), C(1), and the blank included in the (2, 1, 2), (2, 2, 1), (2, 2, 2), (2, 3, 1), and (2, 3, 2) identifier subgroups depicted in FIG. 8. For the third classifier variable, the bundle signals are produced to represent two representative names which are B(1-2) and C(1-2) included in the (3, 4, 1) and (3, 5, 1) identifier subgroups. In this manner, operation of the signal bundle name determining unit 18 comes to an end as regards each value of the current classifier variable n.

Reviewing FIGS. 6 through 8, it can be understood that a combination of the bundle rule memory 17 and the signal bundle name determining unit 18 serves as a signal bundle name determining arrangement. Comprising a classifying arrangement, a bundle signal name determining arrangement, and a bundle signal producing arrangement, the signal bundle name determining arrangement is operable as follows. In the signal bundle name determining arrangement, the bundle signal name determining arrangement is so named merely for clarity of description.

The classifying arrangement is connected to the group signal producing arrangement of the group and set determining unit 16 and is for carrying out the first and the second steps 41 and 42 and parts of the third and the fourth steps 43 and 44 to classify the identifier groups into a plurality of identifier subgroups which are not less in number than the identifier groups. In the example being illustrated, the three great identifier groups (1, 1), (2, 1) through (2, 3), and (3, 4) and (3, 5) are classified into six identifier subgroups of the first kind (1, 1, 1), (2, 1, 1), (2, 2, 1), (2, 3, 1), (3, 4, 1), and (3, 5, 1) and two identifier subgroups of the second kind (2, 2, 2) and (2, 3, 2). Each of the identifier subgroups of the first and the second kinds includes one of the signal names of the connection information, such as A, B, or C, as the signal bundle name. It should be noted in this connection that the signal bundle names are not yet used in the identifier subgroups.

The bundle signal name determining arrangement is connected to the classifying arrangement and is for executing a remaining part of the third step 43 to determine the signal bundle names in connection with the identifier subgroups of the first kind, respectively. The bundle signal producing arrangement is connected to the bundle signal name determining arrangement and is for executing the fifth step 45 to produce the bundle signals representative of the signal bundle names, respectively.

For the identifier subgroups of the second kind, the classifying arrangement carries out the first and the second steps 41 and 42 and a part of the fourth step 44 to classify the great identifier groups further into identifier groups of the second kind. The bundle signal name determining arrangement executes a remaining part of the fourth step 44 to determine a signal bundle name, such as C(1) or the blank alone, in connection with each identifier subgroup. The bundle signal producing arrangement executes the fifth step 45 to produce the bundle signals representative of the signal bundle names.

Summarizing, the signal bundle name determining arrangement is connected to the group determining unit and is for determining a plurality of signal bundle names. In connection with the identifier subgroups of the first kind, each signal bundle name is determined for the signal names represented by each group signal to be identical with each other. In connection with the identifier subgroups of the second kind, each signal bundle name is determined for only one of the signal names of the connection information that is represented by each of the group signals to be not identical with others of the signal names represented by the last-mentioned each of the group signals.

Turning back now to FIG. 4 and referring afresh to FIG. 9, the group and set determining unit 16 is intermittently operable as the set determining unit when supplied with the bundle signals in connection with each of the identifier subgroups, namely, in connection with each value of the current pin variable m. Operation of the group and set determining unit 16 is described hereinabove with regard to the first classifier variable. The bundle signal therefore represents the (1, 1, 1) identifier subgroup illustrated in FIG. 8.

At a sixth step 46 of grouping and set forming, namely, at a first step 46 of set forming, the set determining unit checks the (1, 1, 1) identifier subgroup and refers to the connection information memory 11 to form an identifier set for the first classifier variable in the manner depicted in FIG. 9, left top, in the rectangle. More particularly, the identifier set consists of the symbol tags T01 through T03 and the first classifier CON. Furthermore, the set determining unit supplies the placing and routing arrangement 19 at the sixth step 46 with a set signal representative of the identifier set in connection with the first classifier variable.

It may be mentioned here that the symbol tags are preferably differentiated from one another by numerals, such as 01 through 03 in T01 to T03, which are arranged either in an ascending or a descending order. Alternatively, letters of the alphabet may be used either in a usual order or a reversed order to differentiate the symbol tags. Use is possible of any other marks which are, for example, an asterisk, a dagger, a double dagger, a section mark, a paragraph mark, two asterisks, two daggers, two double daggers, and so forth, and which are in a like consecutive order.

When each identifier set comprises three or more symbol tags, the identifier set is preferably indicated by a first and a second symbol tag and the symbol classifier, wherein the first and the second symbol tags are indicated by those two of the marks which stand first and last in the consecutive order among the symbol tags used in the identifier set under consideration. It is possible to place the first and the second symbol tags and the symbol classifier at three areas of the rectangle, such as at the top, middle, and bottom.

At a seventh step 47 of grouping and set forming, the set determining unit again refers to the connection information memory 11 to supply the placing and routing unit 19 with a signal representative of the signal bundle name and the pin name or names which the identifier set has in correspondence to the signal bundle name. At an eighth step 48, the set determining unit adds one to the first classifier variable to provide the second classifier variable.

At a ninth step 49, the set determining unit refers to the connection information memory 11 to check whether or not all the symbol classifiers are already indicated by the current classifier variable n. If all the symbol classifiers are already indicated, operation of the group and set determining unit 16 comes to an end. If all the symbol classifiers are not yet indicated, the ninth step 49 returns to the first step 31.

At this stage of operation, the current classifier variable n is the second classifier variable indicative of the second classifier SS1. At the third step 33, the group and set determining unit 16 produces the group signals representative of the (2, 1) through (2, 3) small identifier groups depicted in FIG. 5 when the current pin variable m has the values 1 through 3. The bundle signals are sent back to the group and set determining unit 16 to represent the (2, 1, 1), (2, 2, 1), (2, 2, 2), (2, 3, 1), and (2, 3, 2) identifier subgroups. At the sixth step 46, the set determining unit forms first and second identifier sets for the second classifier SS1 in the manner depicted in FIG. 9 in two rectangles between the left and the right ends. The first identifier set consists of the symbol tags SO1 and SO2 and the second classifier SS1. The second identifier set consists of the symbol tag SO3 and the second classifier SS1. These identifier sets are determined by comparing the (2, 1, 1), (2, 2, 1), (2, 2, 2), (2, 3, 1), and (2, 3, 2) identifier subgroups. The symbol tags SO1 and SO2 are common to all these identifier subgroups. The symbol tag SO3 is common to only the (2, 2, 2) and the (2, 3, 2) identifier subgroups.

At the sixth step 46, a set signal representative of the first identifier set is delivered to the placing and routing unit 19. At the seventh step 47, the placing and routing unit 19 is supplied with signals representative of a combination of the signal bundle names B(1-2) and the pin name 02 and another combination of the signal bundle name C(1) and the pin name 03. Again at the sixth step 46, a set signal representative of the second identifier set is sent to the placing and routing unit 19. At the seventh step 47, the placing and routing unit 19 is supplied with a signal representative of a combination of the signal bundle name C(2) and the pin name 02 and another signal representative of the pin name 03 alone.

In this manner, another set signal is delivered to the placing and routing unit 19 at the sixth step 46 to represent another identifier set depicted in FIG. 9, right top. At the seventh step 47, signals are sent to the placing and routing unit 19 to represent a combination of the signal bundle name B(1-2) and the pin name 04 and another combination of the signal bundle name C(1-2) and the pin name 05.

Reviewing the computer aided design system thus far described with reference to nine drawing figures of the accompanying drawing, it can be understood that the classifying arrangement of the signal bundle name determining arrangement classifies the identifier groups into the identifier subgroups of the first and the second kinds, where each identifier subgroup of the first kind includes at least two symbols, such as TO1 through TO3, SO1 and SO2, or SO4 and SO5, as predetermined tags and where each identifier subgroup of the second kind includes only one of the symbol tags, such as SO3 alone, as a predetermined tag. Through the bundle signal determining arrangement, the bundle signal producing arrangement produces the bundle signals of first and second kinds in connection with the identifier subgroups of the first and the second kinds, respectively.

Reviewing FIGS. 4, 5, and 8 in more detail, it can be understood that the set determining unit is connected to the group determining unit in the group and set determining unit 16 and connected to the bundle signal producing arrangement. The set determining unit is for determining the identifier sets as a first predetermined number of identifier sets of a first kind and a second predetermined number of identifier sets of a second kind when supplied with the bundle signals of the first and the second kinds, respectively. Each identifier set of the first kind consists of the predetermined tags and one of the symbol classifiers that classifies, into a common one of the classes, the symbols which are indicated by the predetermined tags, respectively, and have at least one pin name, such as 01, 01 through 03, or 04 and 05. Each identifier set of the second kind consists of the predetermined tag and one of the symbol classifiers that classi- fies, into one of the classes, the symbol which is indicated by the predetermined tag and has at least one pin name, such as 01 through 03. In the example being illustrated, the second predetermined number is equal to unity.

Incidentally, each identifier set of the first kind is determined in connection with at least one of the identifier subgroups of the first kind that is derived from each of the identifier groups. The identifier sets of the first kind are therefore in one-to-one correspondence to the great identifier groups. Each of the identifier sets of the second kind is determined in connection with at least one of the identifier subgroups of the second kind that includes the predetermined tag.

Referring again to FIG. 1, the placing and routing unit 19 is operable in the manner described in the Arya et al paper referred to hereinabove. A little more in detail, the placing and routing unit 19 generates the schematic diagram exemplified in FIG. 9 by placing the identifier sets at a plurality of places and by routing the identifier sets through paths of a network. Ordinarily, each path is between at least a pair of pin names and is labelled by one of the signal bundle names. When labelled by one of the signal bundle names that represents a plurality of signal names, such as A(1-3), B(1-2), or C(1-2), the path is depicted by a thick line as a bus. Such a bus may be only a part of a path of the path network.

While this invention has so far been described in specific conjunction with a single embodiment thereof, it will now be readily possible for one skilled in the art to put this invention into effect in various other ways. Above all, the connection information may be more complicated connection information. Likewise, the bundle rule may be more complicated. In connection with these, it will be readily possible for one skilled in the art to implement the group and set determining unit 16, the signal bundle name determining unit 18, and the placing and routing unit 19 by a computer program for use in putting in operation an electronic digital computer comprising a memory device and registers or work areas.

What is claimed is:

1. A method, implemented by a computer aided design system, for generating a schematic diagram of circuitry in compliance with logic connection information specifying symbol tags indicative of individual symbols, pin names of said symbols, symbol classifiers for classifying said symbols into a plurality of classes, and connection signal names corresponding to said pin names of said symbols, said method comprising the following steps:

determining a plurality of identifier groups, each said identifier group consisting of said symbol tags indicative of said symbols classified into one of said classes and signal names corresponding to at least one of said pin names of said connection information of said symbols classified into said one of said classes;

producing group signals representative of said identifier groups, respectively;

determining a plurality of signal bundle names, each said signal bundle name being determined in connection with said signal names represented by each said group signal to be identical with each other and in connection with only one of said signal names of said connection information that is represented by each of said group signals to be not identical with others of said signal names represented by said each of said group signals;

producing bundle signals representative of said signal bundle names, respectively;

determining a plurality of identifier sets, each said identifier set consisting of at least one symbol tag represented by each of said group signals together with said signal bundle name represented by each of said bundle signals and one of said symbol classifiers that classifies into one of said classes at least one symbol which is indicated by said at least one symbol tag and which has at least one of said pin names that corresponds to the last-mentioned signal bundle name; and generating said schematic diagram by placing said identifier sets at a plurality of places and by routing by said signal bundle names said pin names of said symbols indicated by said symbol tags included in said identifier sets.

2. A method as claimed in claim 1, wherein said step of determining said plurality of signal bundle names comprises the steps of classifying said identifier groups into a plurality of identifier subgroups which are not less in number than said identifier groups, each said identifier subgroup including only one of said signal names of said connection information and determining each of said signal bundle names in connection with said each identifier subgroup by said only one of said signal names; and wherein said step of producing said bundle signals comprises the step of producing said bundle signals by using said signal bundle names determined in connection with said identifier subgroups, respectively.

3. A method as claimed in claim 2, wherein:

said step of classifying classifies said identifier groups into identifier subgroups of first and second kinds, each identifier subgroup of said first kind including at least two symbol tags as predetermined tags, each identifier subgroup of said second kind including only one symbol tag as a predetermined tag;

said step of producing produces bundle signals of first and second kinds in connection with said identifier subgroups of said first and said second kinds, respectively;

said step of determining determines said identifier sets as a first predetermined number of identifier sets of a first kind and a second predetermined number of identifier sets of a second kind when supplied with said bundle signals of said first and said second kinds, respectively, each identifier set of said first kind consisting of said predetermined tags and one of said symbol classifiers that classifies, into a common one of said classes, said symbols indicated by said predetermined tags, each identifier set of said second kind consisting of said predetermined tag and one of said symbol classifiers that classifies, into one of said classes, said symbol indicated by said predetermined tag.

4. A method as claimed in claim 2, wherein said step of determining said plurality of identifier groups comprises the steps of producing a current classifier variable indicative of one of said symbol classifiers at a time to thereby indicate symbols classified, as predetermined ones of said symbols, by said one of said symbol classifiers into one of said classes and producing a current pin variable indicative of pin names of said predetermined ones of said symbols as predetermined ones of said pin names of said connection information while said current classifier variable indicates said one of said symbol classifiers; and wherein said step of producing said group signals comprises the steps of producing each of said group signals to thereby indicate one of said identifier groups that consists of symbol tags indicative of said predetermined ones of said symbols and said signal names corresponding to said predetermined ones of said pin names and supplying said group signals for said step of classifying said identifier groups and said step of determining said plurality of identifier sets.

5. A method as claimed in claim 4, wherein:

said step of producing each of said group signals indicates said one of said identifier groups as a plurality of small identifier groups, equal in number to said predetermined ones of said pin names, each small identifier group consisting of symbol tags indicative of said predetermined ones of said symbols and at least one of said signal names of said connection information that corresponds to each of said predetermined ones of said pin names;

said step of classifying said identifier groups classifies said small identifier groups into said identifier subgroups, respectively.

6. A method as claimed in claim 2, wherein said step of determining said plurality of identifier groups comprises the steps of producing a current classifier variable indicative of one of said symbol classifiers at a time to thereby indicate symbols which are classified, as predetermined ones of said symbols, by said one of said symbol classifiers into one of said classes and have only one pin name in common as a predetermined one of said pin names and producing a current pin variable indicative of said predetermined one of said pin names while said current classifier variable indicates said one of said symbol classifiers;

wherein said step of producing said group signals comprises the steps of producing one of said group signals to thereby indicate one of said identifier groups that consists of symbol tags indicative of said predetermined ones of said symbols and signal names corresponding to said predetermined one of said pin names and supplying said one of said group signals for said step of classifying said identifier groups and said step of determining said plurality of identifier sets; and wherein said step of classifying said identifier groups classifies said one of said identifier groups into one of said identifier subgroups.

7. A method as claimed in claim 1, wherein said symbol tags indicate symbols of at least one of said classes by at least three marks which are in a consecutive order; and wherein at least one of said identifier sets consists of said one of said symbol classifiers and a first and a second one of said symbol tags represented by said each of said group signals, said first and said second ones of said symbol tags being indicated by two of said marks which stand first and last in said consecutive order among marks indicative of symbol tags used in said at least one of said identifier sets.

* * * * *